United States Patent [19]
Kishimoto

[11] Patent Number: 4,950,608
[45] Date of Patent: Aug. 21, 1990

[54] TEMPERATURE REGULATING CONTAINER

[75] Inventor: Masaru Kishimoto, Tokyo, Japan
[73] Assignee: Scinics Co., Ltd., Tokyo, Japan
[21] Appl. No.: 342,805
[22] Filed: Apr. 25, 1989
[51] Int. Cl.⁵ ............................................... C12M 1/38
[52] U.S. Cl. ............................... 435/290; 435/287; 435/276; 165/104.24; 219/439
[58] Field of Search ............... 435/290, 287, 284, 296; 165/13, 14, 30, 104.24, 104.19; 219/439, 441; 126/400; 119/35, 37, 41, 42, 38, 43; 237/3, 14; 236/2

[56] References Cited
U.S. PATENT DOCUMENTS

| 3,117,009 | 1/1964 | Boelter | 435/290 X |
| 4,131,158 | 12/1978 | Abhat et al. | 126/400 X |
| 4,384,193 | 5/1983 | Kledzik et al. | 219/439 X |
| 4,679,615 | 7/1987 | Liune | 236/2 X |

Primary Examiner—Larry Jones
Attorney, Agent, or Firm—Cushman, Darby & Cushman

[57] ABSTRACT

A temperature regulating container with a heater and a metal block in which test tubes with test samples are therein inserted and kept isothermally provides a plurality of heat pipes embedded in the metal block and extended to the heater section located at bottom of the metal block uniformly maintain the temperature in the metal block. Heat tubes are further extended downwardly to a cooling chamber provided at the bottom of heater such that when a cooling medium, water or air flows in the cooling chamber, the metal block is cooled respondingly provide accurate cooling of test samples in test tubes according to a desired program.

4 Claims, 4 Drawing Sheets

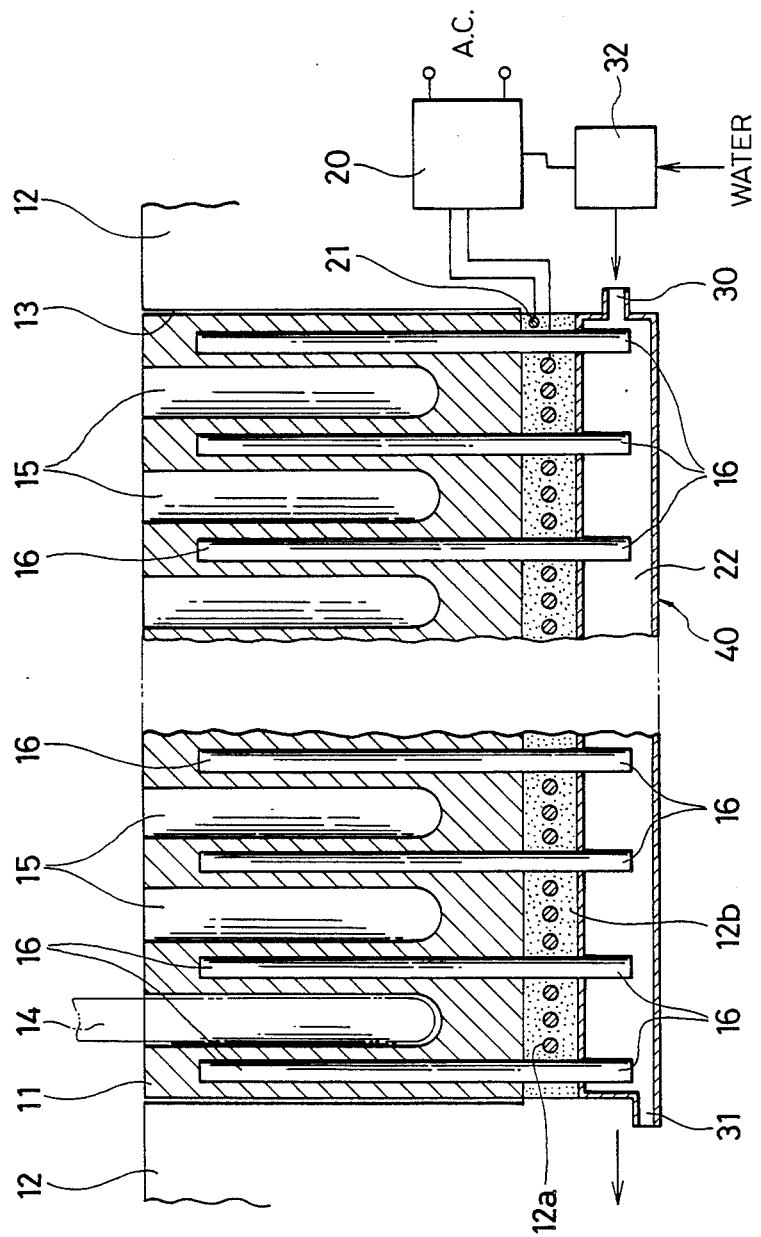

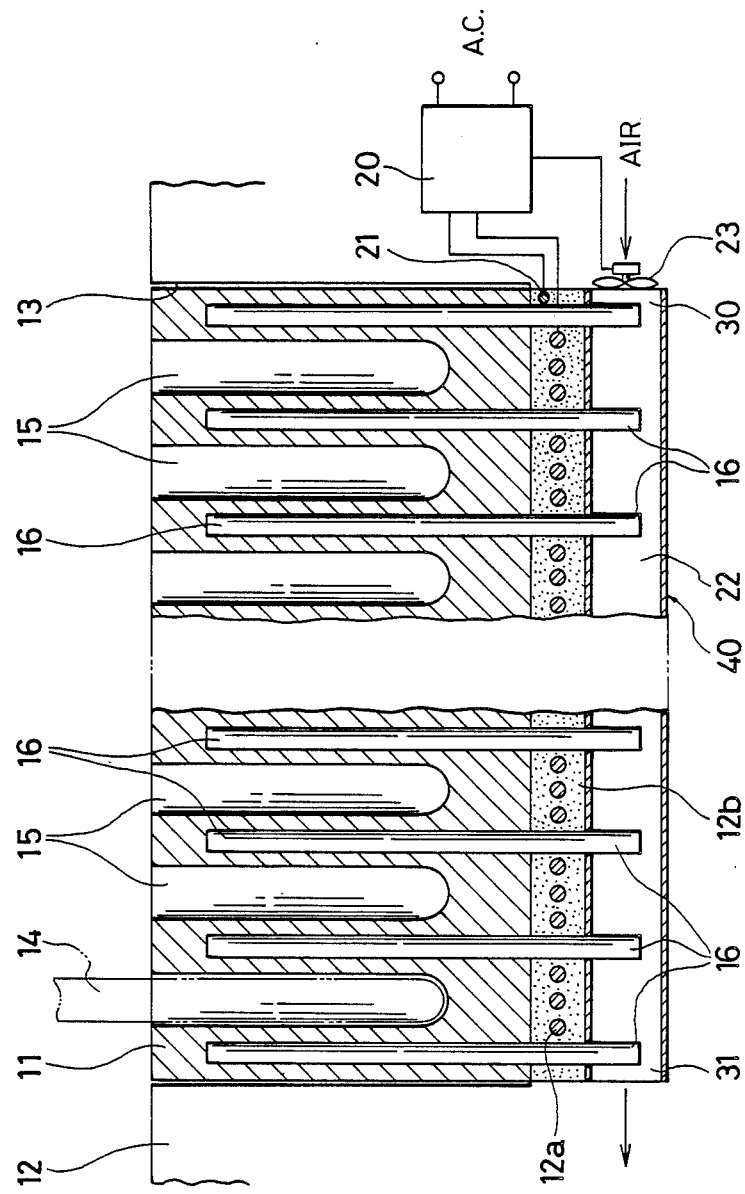

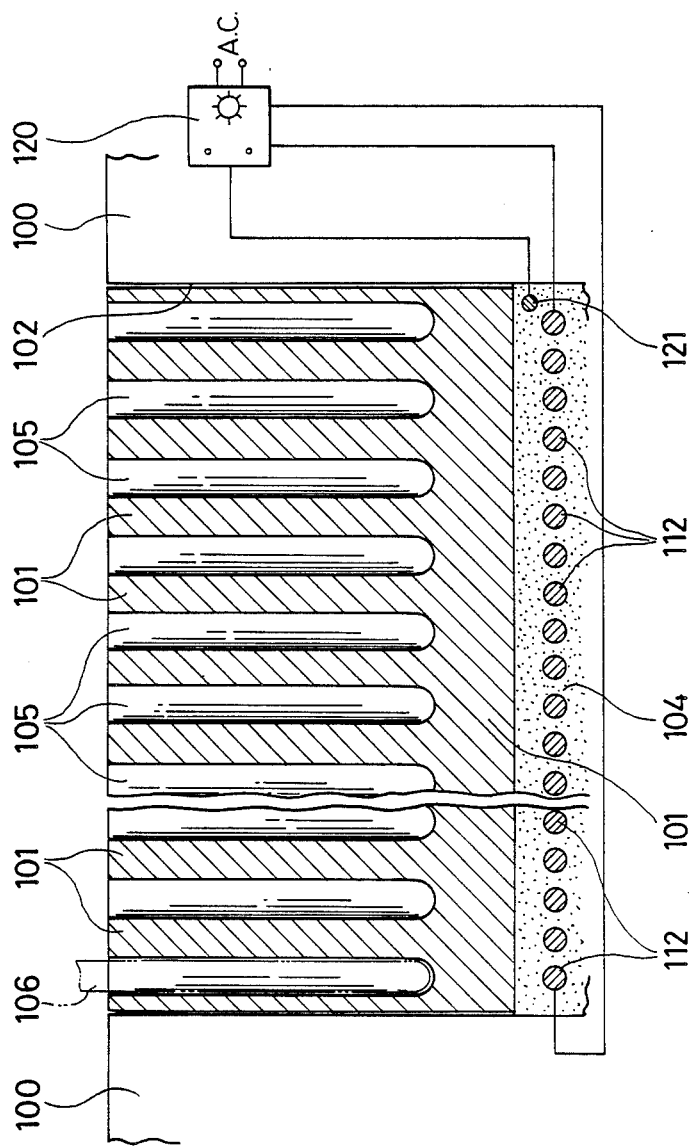

TEMPERATURE REGULATING CONTAINER

BACKGROUND OF THE INVENTION

1. Field of the Invention

This invention relates to a temperature regulating container for laboratory use in which chemical or medical test samples are kept in constant temperature or regulated in accordance with programmed schedules, and more particularly to a temperature regulating container with a metal block accommodated therein such that test tubes with test samples therein insert into the metal block to keep the test samples at more stabilized condition.

2. Description of the Prior Art

Referring to FIG. 7, one conventional temperature regulating container with a metal block therein will be explained. FIG. 7 is a sectional view drawing of a conventional temperature regulating container. A container 100 is made of thermally insulating material and provides a pit 102 wherein a metal block 101 is placed just-fittedly. At the bottom of the pit 102 a heater 112 covered with a thermally insulating material 104 is installed. The heater 103 is connected to a temperature controller 120, and a thermo-couple 121 installed in the insulator 104 senses the temperature and send signals to the temperature controller 120. The temperature controller 120 is adapted to be an on-off control or to be a proportional control regulating electric voltage. The metal block 101 provides receiving holes 105 in which test tubes 106 with test samples therein insert. Where different sizes of test tubes are used, the metal block 101 is replaced and exchanged to another metal block 101 to receive the different test tubes. Thus, the metal block 101 is designed to be detachable. Since so many receiving holes are provided in the metal block, the total surface area of the metal block becomes large, so there existed the difference of temperature between the upper and the lower portion of the metal block 101.

Accordingly, there existed the difference of temperature between the upper and lower portion of the test tube inserted in the receiving hole 105, so from the view-point that the test tube should be kept at the predetermined temperature, the conventional type container can not maintain this stabilized condition.

SUMMARY OF THE INVENTION

One object of the present invention is to eliminate the above mentioned difference of temperature between the upper and the lower portion of the metal block and another object is to propose a temperature regulating container capable of being heated or cooled promptly in accordance with a programmed schedule although the temperature gradient line in relation to time is very steep.

To execute the first object, a plurality of heat pipes in which thermally conductive refrigerant is sealingly charged are embedded vertically in the metal block.

The lower end of the heat-pipe is contacted with the heater and the upper end of the heat pipe is located at upper half portion of the metal block.

To execute the second object, a cooling apparatus is provided at the bottom of the heater section and heat pipes are vertically enbedded in the metal block extending from the cooling chamber to the upper half portion of the metal block via the heater section.

Ambient air or supply water as a cooling source is supplied to the cooling chamber as needed such that a programmed schedule is correctly accomplished although the temperature gradient line in relation to time is very steep.

BRIEF DESCRIPTION OF THE DRAWINGS

FIG. 4 is a sectional view drawing of a temperature regulating container with a cooling apparatus according to the second embodiment of the present invention.

FIG. 6 is a sectional view drawing of a temperature regulating container with a cooling apparatus according to the third embodiment of the present invention.

FIG. 7 is a sectional view drawing of a conventional temperature regulating container with a metal block as is known in the art.

DESCRIPTION OF THE PREFERRED EMBODIMENTS

Figure 1:
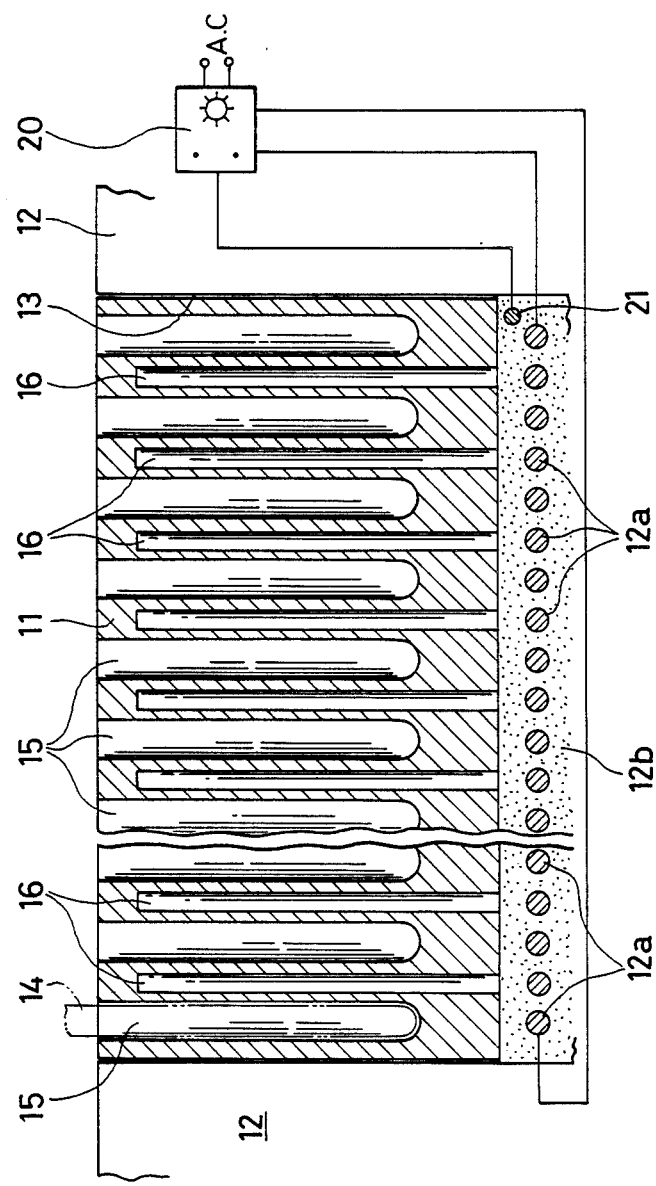
FIG. 1 is a sectional view drawing of a temperature regulating container with a metal block according to the first embodiment of the present invention.
Figure 2:
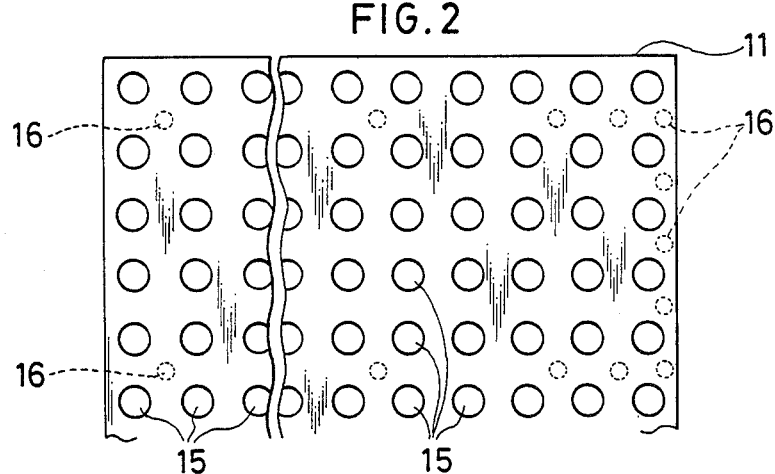
FIG. 2 is a plan view drawing of a metal block according to the present invention.

Referring to the accompanying drawings, preferred embodiments of the present invention will be explained hereinafter. Referring to FIG. 1, numeral 11 denotes a metal block and is made of thermally conductive metal, for instance, aluminum.

Numeral 12 denotes a container body which is made of thermally insulating material, 12a denotes a heater, 12b denotes an insulating material covering the heater 12a, 13 denotes a pit in which the metal block 11 closely and detachably fits. The metal block 11 provides many receiving holes 15 in which a test tube 14 inserts with a close fit. The metal block 11 is detachable to provide for differently sized test tubes. A suitable number of heat pipes 16 are embedded vertically at suitable positions. A lower end of the heat pipe 16 is positioned adjacent to the heater 12a and an upper end is positioned at an upper half portion of the metal block such that heat from the heater 12a is distributed to the spot where a temperature drop is anticipated.

Figure 3:
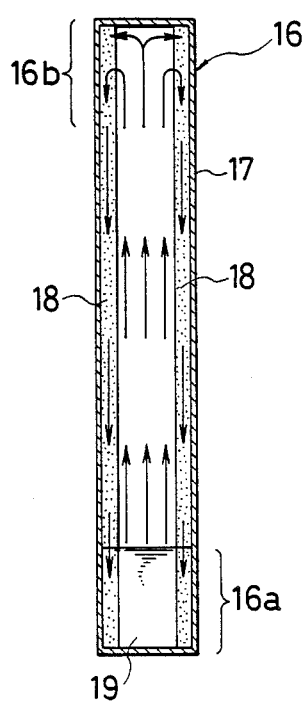
FIG. 3 is an explanatory sectional drawing of a conventional heat pipe.

Construction of the heat pipe 16 is shown in FIG. 3 and such construction is well known.

Referring to FIG. 3, a wick 18 is contacted to an inner wall of a pipe body 17. In the pipe body 17, refrigerant, for instance, water or refrigerant 19 is sealingly charged. A lower portion of the pipe body 17 constitutes an evaporator 16a and an upper portion constitutes a condenser 16b. Refrigerant evaporated at the evaporator 16a condenses at the condenser 16b such that heat is removed from the heater 12a and is rejected to the metal block 11.

Refrigerant condensed at the condenser 16b liquefies and turns back to the evaporator 16a through the wick 18 which is effective to act as a capillary tube. It is not indispensable that the heat pipe must contact with the heater 12a, but if the evaporator is heated by the heater, positional relation of contact between the heater and the heat pipe is satisfactory enough and it is not a matter of importance.

The heater may take a rod type or a ribbon type or any type, and connecting means between the heater and the pit 13 may take any various formations. The metal block 11 adapted to receive the predetermined test tubes 14 is selected and placed in the pit 13. The test tubes with test samples therein insert vertically in the receiving holes 15 as shown in FIG. 1.

Turning a control knob of the temperature controller 20, will select a desired temperature setting and switch on the heater when appropriate.

A thermo-couple 21 senses the temperature setting and sends a signal to control the temperature controller by means of an on-off control or a proportional control which adjusts electric voltage.

The metal block 11 is heated and the heat pipes 16 are also heated and transfer heat from the evaporator 16a to the condenser 16b such that the metal block 11 surrounding the condenser 16b is heated. This shortens the time required to heat the metal block up to the temperature setting. In the case of an on0off control, the termperature setting will be obtained in a short time, while in the case of a proportional control, temperature responsing will be very sensitive.

As aforementioned, the large number of receiving holes 15 caused the total surface area of the metal block to be considerably large and caused the temperature difference between the upper and lower portion of the receiving holes 15.

But the heat pipes 16 are effective to reduce such temperature differences and to keep the temperature of the entire metal block 11 uniform thereby maintaining the test samples in the test tubes the desired temperature setting.

Referring from FIG. 4 to FIG. 6, other embodiments of the present invention will be explained.

When the temperature of a temperature regulating container is program controlled in relation to time, and heating and cooling are repeated, the temperature regulating container with heat pipes embedded in the metal block as aforementioned can not accurately follow the program when the temperature falling line is very steep.

Figure 5:
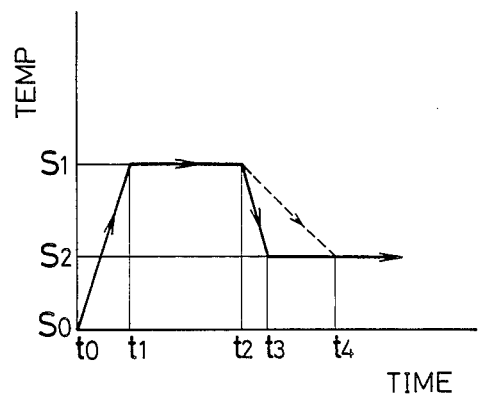
FIG. 5 is an explanatory drawing of a temperature-time program according to the present invention.

Referring to FIG. 5, the solid line shows a programmed temperature line. Since heat pipes are provided in the metal block, when the temperature is scheduled to rise, the temperature in the temperature regulating container follows up in accordance with the program but when the temperature is scheduled to fall from S1 to S2 within time t2 to t3, the actual temperature gradient line will be shown as a dotted line and takes time within t2 to t4.

In such a case, the heat pipes 16 embedded in the metal block 11 will be effective to lower the temperature quickly by providing a cooling apparatus 40 in which the lower end of the heat pipes 16 are extended as shown in FIG. 4.

The cooling apparatus 40 comprises a cooling chamber 22, a water supply valve 32, a temperature controller 20 which controls the water supply valve 32, an inlet 30 and an outlet 31. Referring to FIG. 5, at time t2, the temperature controller 20 sends signals to open the supply valve 32 and to open electric circuit for the heater 12a. The temperature controller 20 opens the electric circuit to the heater 12 a to prevent the heater 12a from being turned on by the thermocouple 21 as the temperature drops from S1.

Water flows into the cooling chamber 22 from the inlet 30 and flows out from the outlet 31. Since the lower ends of the heat pipes 16 are cooled by water, the lower ends act as condensers and the upper ends act as evaporators.

Refrigerant goes up through the wick 18 (FIG. 3) since the wick 18 is effective to act as a capillary tube, thus the metal block 11 is cooled quickly and temperature S1 is cooled to S2 within time t2 to t3 as the programmed schedule.

Referring to FIG. 6, the third embodiment of the present invention will be explained. In this embodiment air is used as a cooling source in lieu of water.

Referring to FIG. 5, at time t2, a temperature controller 20 sends signals to energize a fan 23 and ambient air flows in from an inlet 30 and flows out from an outlet 31 and simultaneously opens electric circuit to a heater 12a to prevent the heater 12a from being switched on by the thermocouple 21 as the temperature drops from S1.

As aforementioned in reference to FIG. 4 when using water as the cooling source, the lower end of the heat pipes 16 act as condensers and the upper ends act as evaporators and the liquid refrigerant goes up through wicks 18 (FIG. 3) which act as capillary tubes, and thus a metal block 11 is cooled by ambient water quickly.

There are several methods which can be used to attach the cooling apparatus as described in the second and third embodiments to keep the metal block detachable.

One preferred way is to provide holes passing through the heater section and upper wall of the cooling chamber such that the metal block with heat pipes embedded and projecting downwardly insert into these holes as the metal block is placed in the pit.

According to the present invention, the heat pipes are embedded at many spots where temperature differences are anticipated in the metal block, so, temperature in the metal block is kept uniform entirely, and when temperature of test samples are program controlled, the temperature regulating container according to the present invention can follow the program exactly.

As many apparently widely different embodiments of this invention may be made without departing from the spirit and scope thereof, it is to be understood that the invention is not limited to the specific embodiments thereof except as defined in the appended claims.

What is claimed is:

1. A temperature regulating container comprising a heater installed in said container, a metal block detachably installed in said container in which test tubes or the like with test sample therein inserted, characterized in that a plurality of heat pipes with refrigerant sealingly charged therein are embedded in said metal block such that one end of said heat pipe is heated by said heater, the heat pipes maintaining an equilibrium temperature between an upper surface and a lower surface of the metal block.

2. A temperature regulating container comprising a heater installed in said container, a metal block detachably installed in said container in which test tubes or the like with test samples therein inserted, a cooling apparatus installed under said heater, a plurality of heat pipes embedded extending from said metal block to said cooling apparatus.

3. A temperature regulating container as claimed in claim 2 in which said cooling apparatus comprises a cooling chamber in which supply water flows through, a supply water valve controlled by a temperature controller.

4. A temperature regulating container as claimed in claim 2 in which said cooling apparatus comprises a cooling chamber in which ambient air flows through, a fan with a motor controlled by a temperature controller.

* * * * *